United States Patent

Given

Patent Number: 5,135,120
Date of Patent: Aug. 4, 1992

[54] MULTI-FIXTURE RACK SYSTEM

[75] Inventor: Michael W. Given, Waterford, Mich.

[73] Assignee: Rayco Manufacturing, Inc., Rochester Hills, Mich.

[21] Appl. No.: 640,203

[22] Filed: Jan. 11, 1991

[51] Int. Cl.$^5$ .......................... A47F 5/00; B25B 11/00
[52] U.S. Cl. .......................... 211/13; 269/21; 51/235
[58] Field of Search .............. 211/13; 269/21, 20; 51/235

[56] References Cited

U.S. PATENT DOCUMENTS

| | | | |
|---|---|---|---|
| 2,317,348 | 4/1943 | Wekeman | 248/363 |
| 2,782,574 | 2/1957 | Copold | 51/235 |
| 3,520,055 | 7/1970 | Jannett | 29/628 |
| 4,174,847 | 11/1979 | Wiesler | 279/1 L |
| 4,258,928 | 3/1981 | Wiesler | 279/1 L |
| 4,640,501 | 2/1987 | Poland | 269/21 |
| 4,723,766 | 2/1988 | Beeding | 269/21 |
| 4,805,887 | 2/1989 | Ray | 269/21 |

Primary Examiner—Robert W. Gibson, Jr.
Attorney, Agent, or Firm—Basile and Hanlon

[57] ABSTRACT

A multi-fixture rack system for inspecting a part on an automated assembly line comprising a main plate assembly having coordinate-labelled mounting holes for mounting a series of sub-plate assemblies. Each sub-plate assembly has coordinate-labelled mounting holes for receiving clamps and vacuum clamp holders. The locations of the clamps and vacuum clamp holders are preset for a particular part to be measured on each sub-plate. The sub-plates are stored on component trays in a rack near a measuring device.

20 Claims, 2 Drawing Sheets

MULTI-FIXTURE RACK SYSTEM

BACKGROUND OF THE INVENTION

I. Field of the Invention

The present invention relates generally to a multi-fixture rack system. More particularly, the present invention relates to a multi-fixture rack system for use with a universal vacuum and clamp set-up fixture for measuring a wide variety of different parts.

II. Description of the Prior Art

Newly developed automated factories having automated assembly lines provide for an automated inspection process of the manufactured part assembled in the factory. Typically, an automated inspection process is used to assure quality control of mass produced parts. Inspection of parts may also be required where high levels of tolerance of a part are necessary, such as in aeronautical parts.

Automated inspection equipment may take the form of a computer controlled video camera placed above an assembly line setting. As the parts travel on the assembly line below the camera, a computer reads the picture to determine if a random part is within standard tolerance.

Other automated inspection equipment may include the use of coordinate measuring machines utilizing a fixed work surface for placement of the piece to be measured. A part is oriented on the work surface and a measuring probe attached to a coordinate measuring machine measures the part and compares it with standard acceptable tolerances.

An example of automated inspection equipment of this general type is disclosed in U.S. Pat. No. 4,805,887. The device disclosed in this patent includes the utilization of a perforated work surface having a coordinate system corresponding to the perforations. A variety of clamps and vacuum clamp holders may be placed in the perforations of the plate and are used to support the piece to be measured. A vacuum source directs a vacuum to the vacuum clamp holders. The vacuum clamp holders are equipped with flexible suction cup clamps which exert minimum distortion loads on the clamped parts.

Although this system provides a means for measuring a part without distorting the part by clamping, it does not provide for an error-free environment. In particular, the user may not be aware that the clamps and vacuum clamp holders are mislocated thereby giving a false reading to the measuring probe. Further, only one part may be measured at a time. For example, if an assembly line produces a multiplicity of parts, as is usually the case, the present measuring system only provides for measurement of one part. Therefore, several measuring devices must be set up to enable several different parts to be measured or the user must break down and reset the clamp set-up when measuring different parts. This is a time-consuming operation which may cause great errors if the operator fails to perform each set-up precisely.

SUMMARY OF THE INVENTION

The present invention provides an apparatus which overcomes the disadvantages of the previously known measuring devices. The system of the present invention provides a multi-fixture rack system comprising a plurality of sub-plates for measuring several parts. Each sub-plate has coordinate-labelled mounting holes for receiving clamps and vacuum clamp holders. The locations of the clamps and vacuum clamp holders are preset for a particular part to be measured on each sub-plate. The sub-plates are stored on component trays in a rack near the measuring device.

A main plate assembly is located on the measuring device and also comprises coordinate-labelled mounting holes. The operator removes a sub-plate assembly from the rack and locates it on the main plate assembly in relationship to the proper coordinate-labelled hole. The operator then places the corresponding part to be measured on the vacuum clamp holders and activates the measuring probe. When a new part to be measured is different than the previously measured part, the operator simply removes the sub-plate from the main plate assembly and places the sub-plate back onto the rack. The proper sub-plate assembly corresponding to the new part is then placed on the main plate assembly having corresponding, properly placed vacuum clamp holders and clamps. The new part is placed on the vacuum clamp holders and measured by the measuring probe.

A bar code may be provided on the main plate assembly and on the sub-plate assembly. The bar code on the main plate assembly may be read by the computer to aid the operator in determining the proper location of the sub-plate assembly in the main plate's coordinate-labelled holes. Two bar codes may be supplied on the sub-plate assembly. One bar code may be read by the computer to identify the proper placement of the vacuum clamp holders and clamps for positioning the part on the sub-plate assembly. Another bar code provided on the sub-plate assembly may be read by the computer to activate the measuring probe with the proper measuring program for that part.

This system enables an operator to measure a multiplicity of different parts with great accuracy. The use of several preset sub-plate assemblies eliminates the need for breaking down and rearranging the vacuum clamp holders and clamps in the proper position for each part.

A still further advantage of the present invention is that the main plate and sub-plate assemblies may be provided with an automatic locating system. This system prevents any errors which may result from misplacement of the part on the measuring device or the use of the wrong measuring program with the part to be measured.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DESCRIPTION OF THE PREFERRED EMBODIMENT

Figure 1:
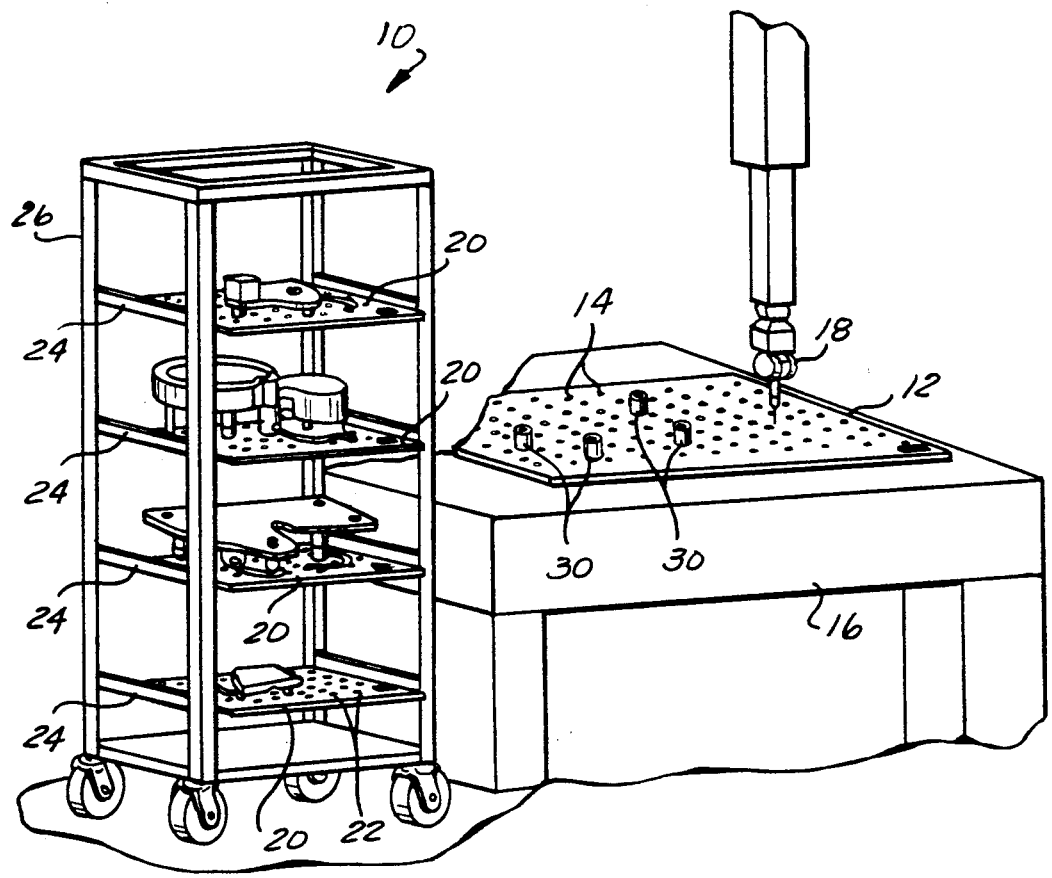
FIG. 1 is a perspective view illustrating a preferred embodiment of the present invention.

With reference first to FIG. 1, a multi-fixture rack system embodying the present invention is there shown at 10. The system 10 comprises a main plate assembly 12 having coordinate-labelled mounting holes 14. The main plate assembly 12 is located on a coordinate measuring machine 16 having a multi-directional measuring probe 18 attached thereto.

A plurality of sub-plate assemblies 20 having coordinate-labelled mounting holes 22 are there shown stored on component trays 24 and a rack 26.

Figure 2:
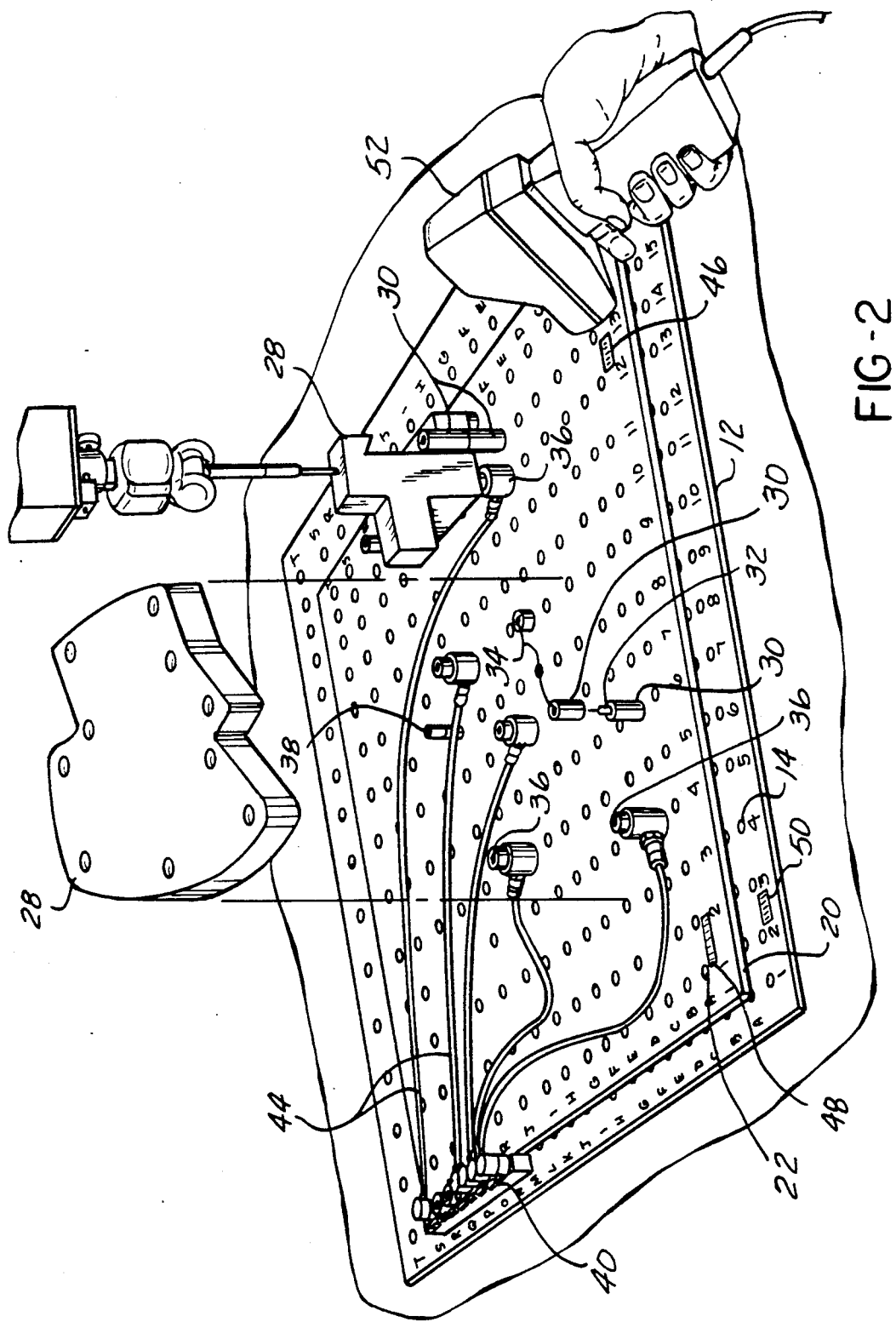
FIG. 2 is an exploded perspective view of the components of the present invention.

With reference now to FIG. 2, a sub-plate assembly 20 having a part 28 to be measured is there shown. A plurality of stackable cylinders 30 are positioned within mounting holes 22. Cylinders 30 are located in a predetermined mounting hole 22 for supporting a part 28 in its proper location on the sub-plate 20. The cylinders 30 screw into the mounting holes 22 by extended shafts 32. A threaded aperture 34 is provided on top of the cylinder 30 for receiving a second cylinder where necessary to properly support the part 28.

Vacuum cups 36 and magnets 38 are located within the mounting holes 22 of the sub-plate assembly 20 using a similar coupling method as the cylinders 30. The vacuum cup 36 and magnet 38 properly locate and support the part 28 to be measured.

With reference now to FIG. 1, the main plate assembly 12 is there shown having a plurality of stackable cylinders 30 positioned in mounting holes 14 for proper location of the sub-plate assembly 20 on the main plate 12. A manifold assembly 40 is attached to the main plate assembly 12. A vacuum pump (not shown) and a plurality of hoses 44 extend from the manifold assembly 40. Hoses 44 attach to vacuum cups 36 on the sub-plate assembly 20 and provide a vacuum from the vacuum pump 42 to the cups 36 for supporting the part 28 in its proper position.

In the preferred embodiment, a bar code 46 is provided on one corner of the sub-plate assembly 20. The bar code 46 is pre-programmed with the proper measurements and tolerances for a particular part to be measured. A second bar code 48 may be located on the opposite corner of the sub-plate 20. This bar code 48 is pre-programmed with the proper positioning location on the coordinate-labelled sub-plate for the stackable cylinders 30, vacuum cups 36 and magnets 38. The bar code 48 corresponds to the same part 28 as bar code 46 on the sub-plate assembly 20.

Another bar code 50 may be maintained on the main plate assembly 12. Bar code 50 is pre-programmed with the proper location of the sub-plate assembly 20 on the main plate assembly 12. This is done by locating stackable cylinders 30 in the coordinate-labelled mounting holes 14 on the main plate assembly 12 in accordance with the computer program.

In use, a rack 26 having a plurality of sub-plate assemblies 20 is provided to an operator near coordinate measuring machine 16. Each sub-plate assembly 20 is preset with cylinders, vacuum cups and magnets for properly locating a part 28 to be measured. Each sub-plate assembly 20 corresponds to a different part 28. The operator removes a part to be measured from a conveyor system or the like. The corresponding sub-plate assembly 20 is removed from the rack 26 and placed on the main plate assembly 12. The part 28 is placed atop the vacuum cups, magnets and stackable cylinders in its proper position. Bar code 46 is read by a computer system 52 which activates the proper measuring program to be used by the measuring probe 18.

As a different part 28 is removed from a conveyor system, the corresponding sub-plate assembly 20 is removed from rack 26 and placed in its proper position on the main plate assembly 12. Bar code 46 is then read by the computer and the corresponding part measuring program activates the measuring probe 18. In this way, the operator is relieved of several time-consuming and error-prone steps. The operator simply replaces each sub-plate assembly 20 with the proper sub-plate assembly corresponding to the part to be measured on the main plate assembly 12.

When the multi-fixture rack system is provided with two bar codes on the sub-plates 46, 48 and a bar code on the main plate assembly 12, the following procedure applies. The operator reads the bar code 50 on the main plate to activate the sub-plate positioning program o the computer. The computer then determines the exact position of stackable cylinders 30 and magnets 38 to position the sub-plate 20 in the proper coordinates on the main plate assembly 12. Once the sub-plate 20 is located on the main plate 12, bar code 48 is read by the computer to determine the proper locations of cylinders 30, vacuum cups 36 and magnets 38. The computer shows the operator the exact mounting holes 22 to be used by the above locating parts to position the part 28 properly. Bar code 46 is then read by the computer and activates the proper measurement and tolerances corresponding to the part to be measured 28. The computer then gives a readout of any deviations to these measurements by the part.

The above multi-fixture rack system 10 virtually eliminates any error which may be made by the operator during the set-up and measuring operation. The operator will know immediately when a positioning error has been made, thus eliminating the operator's waste of time and avoiding re-measurement of the part.

Having described my invention, however, many modifications thereto will become apparent to those skilled in the ar to which it pertains without deviation from the spirit of the invention as defined by the scope of the appended claims.

I claim:

1. A multi-fixture rack system comprising:
   a main plate assembly;
   at least one sub-plate assembly mountable upon said main plate assembly;
   means for locating said sub-plate assembly on said main plate assembly;
   means for locating a part to be measured on said sub-plate assembly;
   means for removably receiving said part on said sub-plate assembly; and
   means for storing said sub-plate assembly.

2. The invention as defined in claim 1, said sub-plate locating means comprising coordinate-labelled mounting holes within said main plate assembly.

3. The invention defined in claim 2 and further comprising positioning means receivable within said main plate mounting holes for locating said sub-plate on said main plate.

4. The invention as defined in claim 3, said positioning means comprising a plurality of stackable cylinders, said cylinders removably engageable with said main plate mounting holes.

5. The invention as defined in claim 4, said part locating means comprising coordinate-labelled mounting holes within said sub-plate assembly.

6. The invention as defined in claim 5 and further comprising positioning means receivable within said sub-plate mounting holes for locating said part on said sub-plate.

7. The invention as defined in claim 6, said positioning means comprising a plurality of stackable cylinders, said cylinders removably engageable with said sub-plate mounting holes.

8. The invention as defined in claim 7, said part receiving means comprising a manifold assembly fixedly connected to said main plate, a vacuum pump fixedly attached to said manifold, and a plurality of hoses removably attached to said manifold;
said receiving means creating a vacuum for retaining said part for measuring.

9. The invention as defined in claim 8, said storing means comprising a plurality of trays, said trays receivable by a rack assembly.

10. A multi-fixture rack system comprising:
a main plate assembly;
at least one sub-plate assembly mountable upon said main plate assembly;
means for locating said sub-plate assembly on said main plate assembly;
means for locating a part to be measured on said sub-plate assembly;
means for removably receiving said part on said sub-plate assembly; and
means for storing said sub-plate assembly;
a bar code system attached to said main plate assembly for positioning said sub-plate assembly on said main plate assembly; and
a plurality of bar code systems attached to said sub-plate assembly, one of said bar code systems for positioning said part on said sub-plate assembly, the other of said bar code systems for measuring said part.

11. The invention as defined in claim 10, said sub-plate locating means comprising coordinate-labelled mounting holes within said main plate assembly.

12. The invention defined in claim 11 and further comprising positioning means receivable within said main plate mounting holes for locating said sub-plate on said main plate.

13. The invention as defined in claim 12, said positioning means comprising a plurality of stackable cylinders, said cylinders removably engageable with said main plate mounting holes.

14. The invention as defined in claim 13, said part locating means comprising coordinate-labelled mounting holes within said sub-plate assembly.

15. The invention as defined in claim 14 and further comprising positioning means receivable within said sub-plate mounting holes for locating said part on said sub-plate.

16. The invention as defined in claim 15, said positioning means comprising a plurality of stackable cylinders, said cylinders removably engageable with said sub-plate mounting holes.

17. The invention as defined in claim 16, said part receiving means comprising a manifold assembly fixedly connected to said main plate, a vacuum pump fixedly attached to said manifold, and a plurality of hoses removably attached to said manifold;
said receiving means creating a vacuum for retaining said part for measuring.

18. The invention as defined in claim 17, said storing means comprising a plurality of trays, said trays receivable by a rack assembly.

19. A multi-fixture rack system comprising:
a large main plate having coordinate-labelled mounting holes;
a manifold assembly fixedly connected to said master plate;
a vacuum pump fixedly attached to said manifold;
a plurality of hoses removably attached to said manifold;
a plurality of sub-plates having coordinate-labelled mounting holes, said sub-plates mountable upon said main plate;
a plurality of stackable cylinders for locating said sub-plates on said master plate, said cylinders receivable within said main plate mounting holes;
a bar code system attached to said main plate for locating said cylinders on said main plate;
a plurality of stackable cylinders for locating a part to be measured on said sub-plates, said cylinders receivable within said sub-plate mounting holes;
a plurality of magnets for locating a part to be measured on said sub-plates, said magnets receivable within said sub-plate mounting holes;
a plurality of vacuum cups for engaging said part on said sub-plates, said vacuum cups receivable within said sub-plate mounting holes and removably attached to said hoses;
a bar code system attached to said sub-plates for locating said cylinders, said magnets and said vacuum cups on said sub-plates within said mounting holes;
a bar code system attached to said sub-plates for measuring said part;
a plurality of component trays for storing said sub-plates; and
a rack for receiving said component trays.

20. A multi-fixture rack system comprising:
a large main plate having coordinate-labelled mounting holes;
a manifold assembly fixedly connected to said master plate;
a vacuum pump fixedly attached to said manifold;
a plurality of hoses removably attached to said manifold;
a plurality of sub-plates having coordinate-labelled mounting holes, said sub-plates mountable upon said main plate;
a plurality of stackable cylinders for locating said sub-plates on said master plate, said cylinders receivable within said main plate mounting holes;
a plurality of stackable cylinders for locating a part to be measured on said sub-plates, said cylinders receivable within said sub-plate mounting holes;
a plurality of magnets for locating a part to be measured on said sub-plates, said magnets receivable within said sub-plate mounting holes;
a plurality of vacuum cups for engaging said part on said sub-plates, said vacuum cups receivable within said sub-plate mounting holes and removably attached to said hoses;
a plurality of component trays for storing said sub-plates; and
a rack for receiving said component trays.

* * * * *